(No Model.)
A. H. HATMAKER.
TREE BOX.
No. 316,262. Patented Apr. 21, 1885.
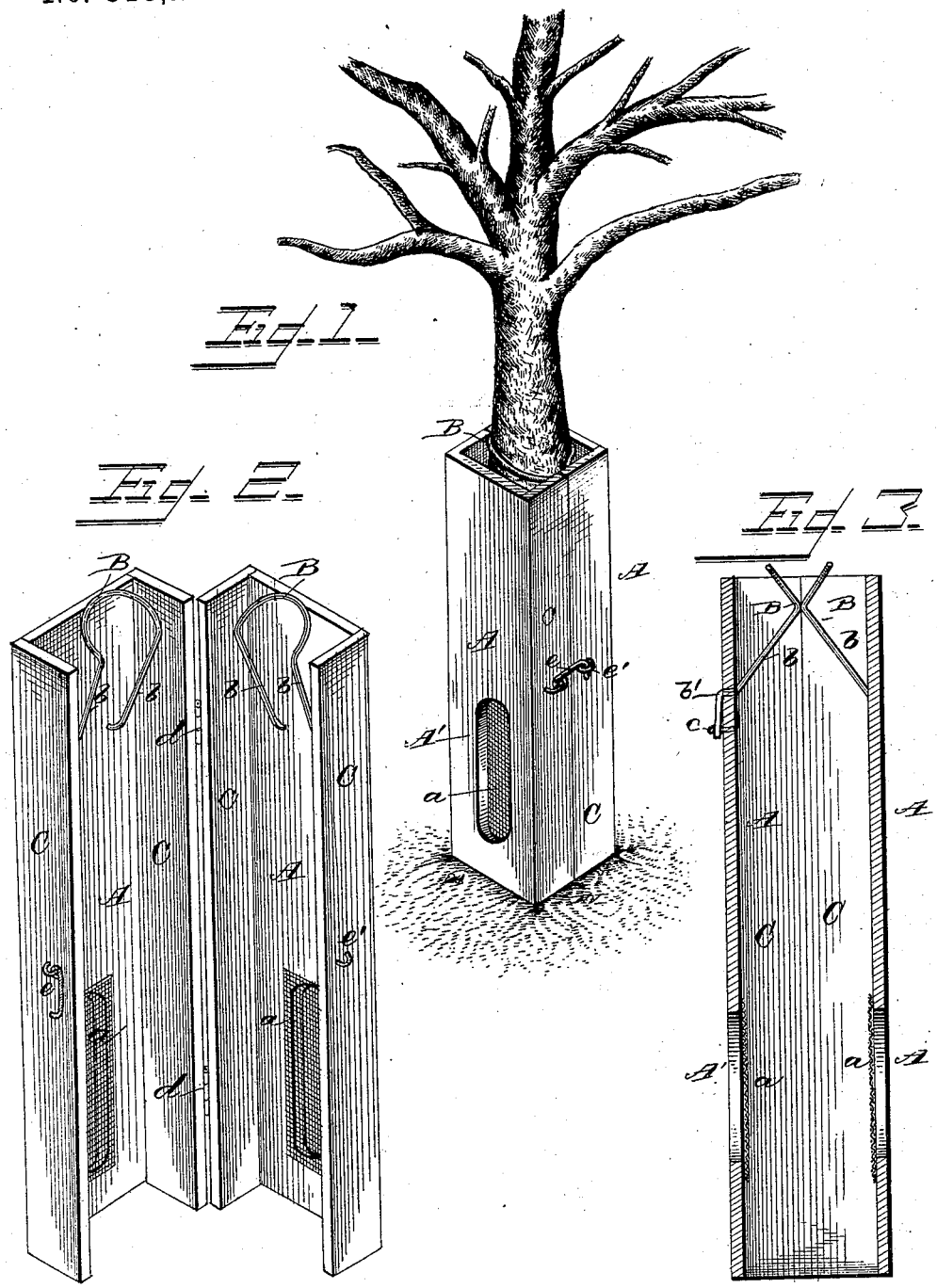

UNITED STATES PATENT OFFICE.

ADAM H. HATMAKER, OF IUKA, ILLINOIS.

TREE-BOX.

SPECIFICATION forming part of Letters Patent No. 316,262, dated April 21, 1885.

Application filed January 22, 1885. (No model.)

*To all whom it may concern:*

Be it known that I, ADAM H. HATMAKER, a citizen of the United States of America, residing at Iuka, in the county of Marion and State of Illinois, have invented certain new and useful Improvements in Tree-Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in tree-boxes, and has for its object to provide a box which will not only serve to support the tree, but will also allow air to have access to the trunk, and will prevent the depredations of insects upon the tree.

In the accompanying drawings, which illustrate my invention, Figure 1 is a perspective view. Fig. 2 is a perspective view showing the sections opened, and Fig. 3 is a vertical section.

A A represent the sides of the tree-box, which are made up of boards of sufficient width. These boards are provided near their lower ends with openings A', over which openings are secured pieces of wire-netting $a$.

To the upper portion of the side pieces, A A, are secured spring-holders B, each of which is made of a single piece of spring-wire. Centrally this spring-wire is curved, from which curved portion the members $b\,b$ depend. The ends $b'\,b'$ are then passed through the side pieces and bent downwardly parallel therewith, the ends being secured to the exterior of the side piece by staples $c\,c$.

To the side pieces, A A, are secured vertical strips C C, a pair of these strips being secured to each other by hinges $d\,d$, the opposite pieces being provided with a hook and eye, $e\,e'$.

The spring-holders B are secured to the side pieces, A, at such a distance from their upper ends that the curved or segmental portions, when bent outwardly, will extend above the upper edges of said boards, thus allowing the box to be placed around a tree of much larger growth than could otherwise be done if said curved portion abutted against the side pieces. To place the box upon a tree it is only necessary to unfasten the hook and open the parts to the position shown in Fig. 2, and after it is closed around the tree it can be made fast upon the same by simply inserting a hook in the eye.

The device hereinbefore described can be readily attached or detached from a tree, and, besides serving as a support and protection therefor, will also allow the air to have access to the trunk.

I claim—

1. In combination with the hinged sections, as shown, the spring-holders B, curved at their upper portions and provided with downwardly-projecting members, which are attached to the side pieces of the box, for the purpose set forth.

2. In a tree-box, the sections hinged to each other and provided with a fastening means, as shown, in combination with the spring-holders, the ends of which are attached to the side pieces of the box, the intermediate portion being curved and bent, so that when said springs are bent toward the side pieces their upper ends will extend over the same, substantially as described, and for the purpose set forth.

In testimony whereof I affix my signature in presence of two witnesses.

ADAM H. HATMAKER.

Witnesses:
JAMES B. RUSSELL,
J. L. FULTON.